(12) United States Patent
Kobayashi (10) Patent No.: US 6,367,599 B2
(45) Date of Patent: Apr. 9, 2002

(54) VENTILATED DISC

(75) Inventor: Tadashi Kobayashi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/730,800

(22) Filed: Dec. 7, 2000

(30) Foreign Application Priority Data

Dec. 7, 1999 (JP) ............................................ 11-347644

(51) Int. Cl.$^7$ .............................................. F16D 65/12
(52) U.S. Cl. .......................... 188/218 XL; 188/264 AA
(58) Field of Search ...................... 188/218 XL, 264 A, 188/264 AA, 18 A, 58

(56) References Cited

U.S. PATENT DOCUMENTS

| | | | | |
|---|---|---|---|---|
| 2,358,134 A | * | 9/1944 | Tack ...................... | 188/218 XL |
| 4,865,167 A | * | 9/1989 | Giorgetti et al. ....... | 188/218 XL |
| 4,928,798 A | * | 5/1990 | Watson et al. ......... | 188/218 XL |
| 5,284,230 A | * | 2/1994 | Takaki .................. | 188/218 XL |
| 5,526,905 A | * | 6/1996 | Shimazu et al. ....... | 188/218 XL |
| 5,542,503 A | * | 8/1996 | Dunn et al. ........... | 188/218 XL |
| 5,544,726 A | * | 8/1996 | Topouzlan et al. .... | 188/218 XL |
| 6,152,270 A | * | 11/2000 | Giorgetti .............. | 188/218 XL |

FOREIGN PATENT DOCUMENTS

| | | | | |
|---|---|---|---|---|
| DE | 3740311 | * | 6/1989 | ........... 188/218 XL |
| JP | 54-17410 | | 6/1979 | |
| JP | 8-164828 | | 6/1996 | |

* cited by examiner

Primary Examiner—Matthew C. Graham
(74) Attorney, Agent, or Firm—Morgan, Lewis & Bockius LLP (57) ABSTRACT

An inner disc portion and an outer disc portion are connected through first to fifth connecting ribs. The second and third connecting ribs which are provided on the outer diameter side are inclined reversely to each other so that a portion where the distance between outer-diameter-side end portions of the second and third connecting ribs is wider and a portion where the distance is narrower are provided alternately. The fourth connecting ribs are provided in the portions where the distance is wider respectively. In addition, each of the fifth connecting ribs are provided between the first connecting ribs and the second and third connecting ribs respectively. The inclination angle θ of the second and third connecting ribs is regulated so that the distances between the end portions of the respective ribs are equal to one another.

12 Claims, 10 Drawing Sheets

VENTILATED DISC

BACKGROUND OF THE INVENTION

Field of the Invention

The ventilated disc according to the present invention is used in the state where the ventilated disc has been incorporated in a disc brake for braking a vehicle.

Figure 7:
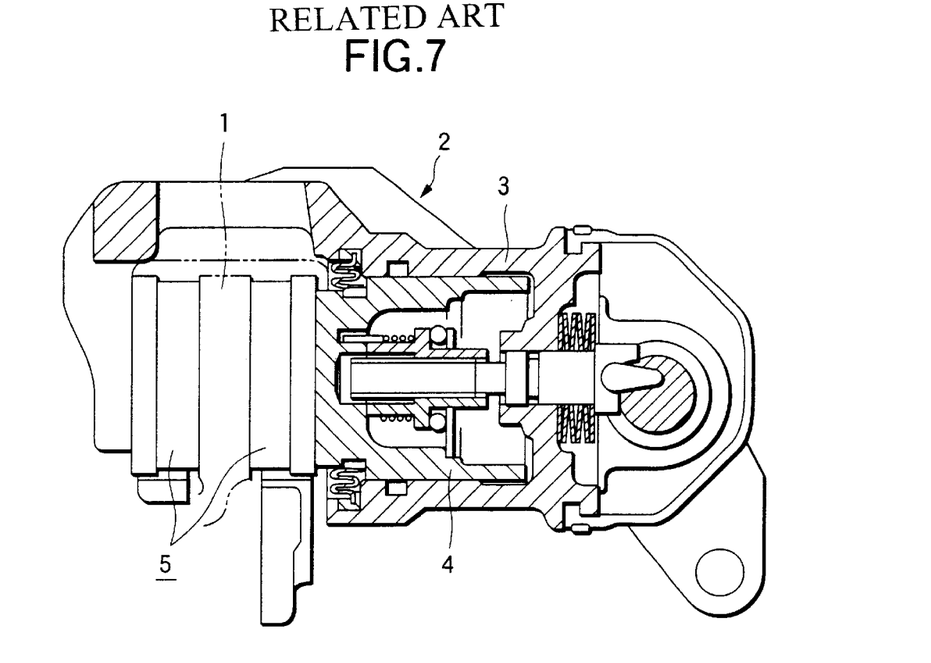
FIG. 7 is a partially sectional view of a disc brake.

Disc brakes are hitherto used broadly as braking apparatus for braking vehicles. FIG. 7 shows a disc brake presented in JIS D 0107. A piston 4 is fluid-tightly fitted into a cylinder 3 provided in a cylinder body 2 supported on a stationary portion astride a disc 1 in which the disc 1 which rotates together with a wheel is supported. At the time of braking, pressure fluid is supplied into the cylinder 3 so that a pair of pads 5 and 5 provided on opposite sides of the disc 1 are pressed against the opposite sides of the disc 1.

Figure 8:
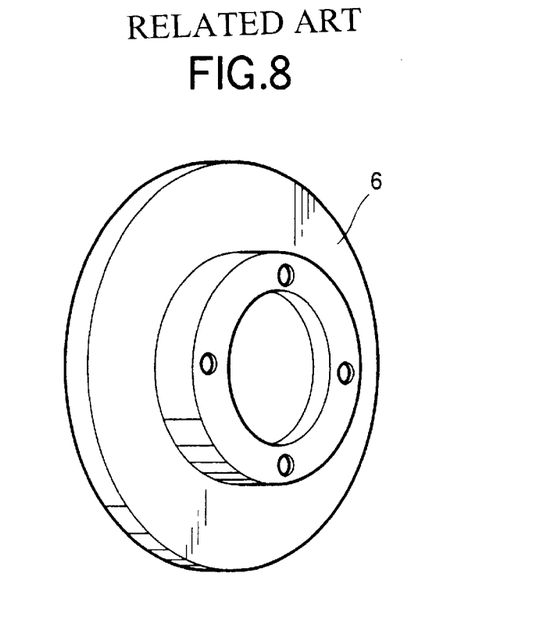
FIG. 8 is a perspective view of a solid disc.
Figure 9:
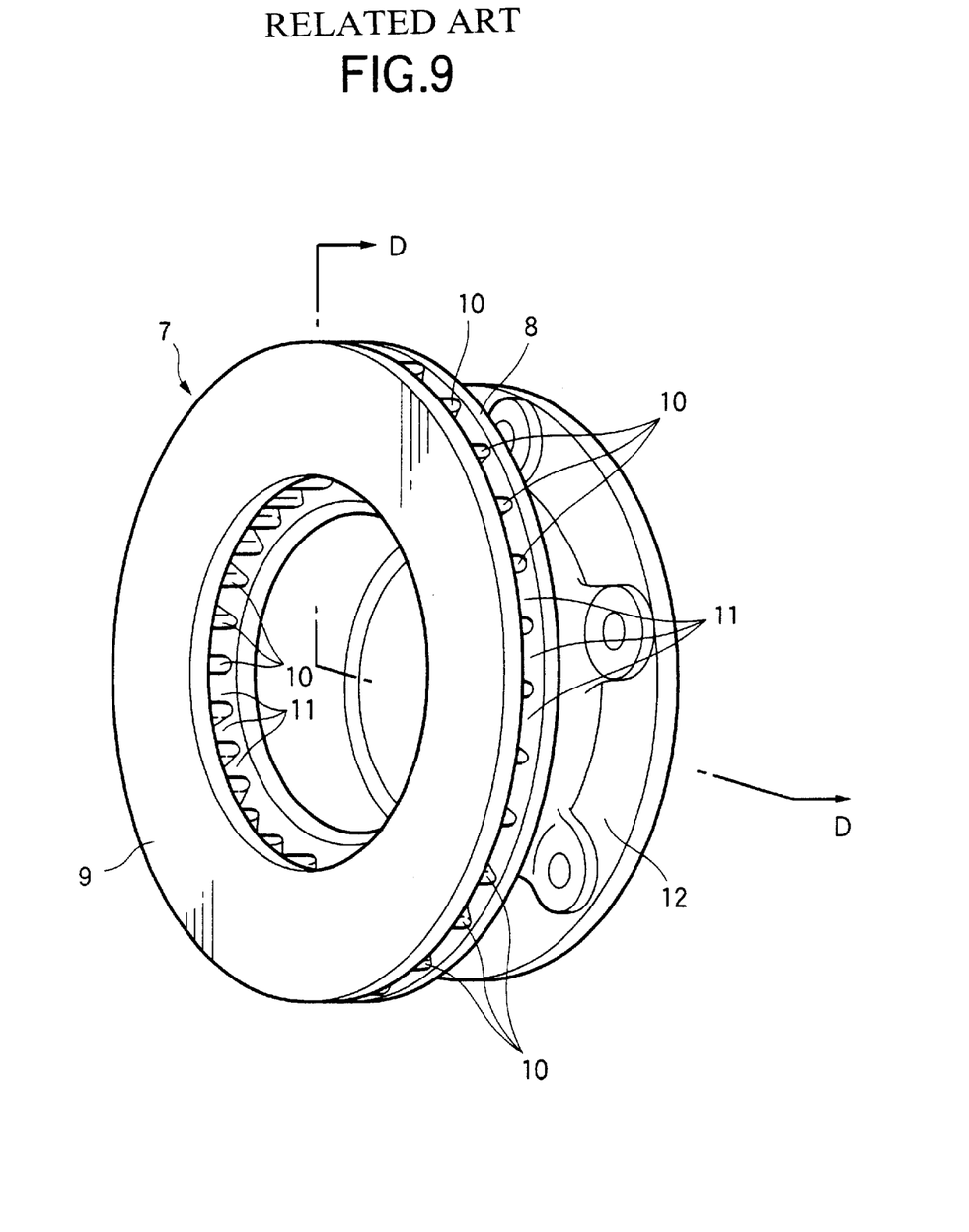
FIG. 9 is a perspective view of a ventilated disc which has been conventionally known.

Other than such a solid disc 6 as shown in FIG. 8, a ventilated disc 7 shown in FIG. 9 is hitherto used as the disc 1 forming such a disc brake. The ventilated disc 7 has a ring-like inner disc portion 8, a ring-like outer disc portion 9, and a large number of connecting ribs (radiator fins) 10. The inner and outer disc portions 8 and 9 are disposed parallelly and coaxially at a distance from each other. The connecting ribs 10 connect respective surfaces of the disc portions 8 and 9 facing each other. Each air channel 11 radially extending is formed between the circumferentially adjacent connecting ribs 10. Such a ventilated disc 7 is fixedly attached to a hub unit which supports the wheel rotatably on the stationary portion, by an attachment portion 12 provided coaxially with the disc portions 8 and 9. When the vehicle is running, the ventilated disc 7 rotates together with the wheel and the air flows in the respective air channels 11 from the inner diameter side to the outer diameter side by centrifugal force to thereby cool the ventilated disc 7.

Figure 10:
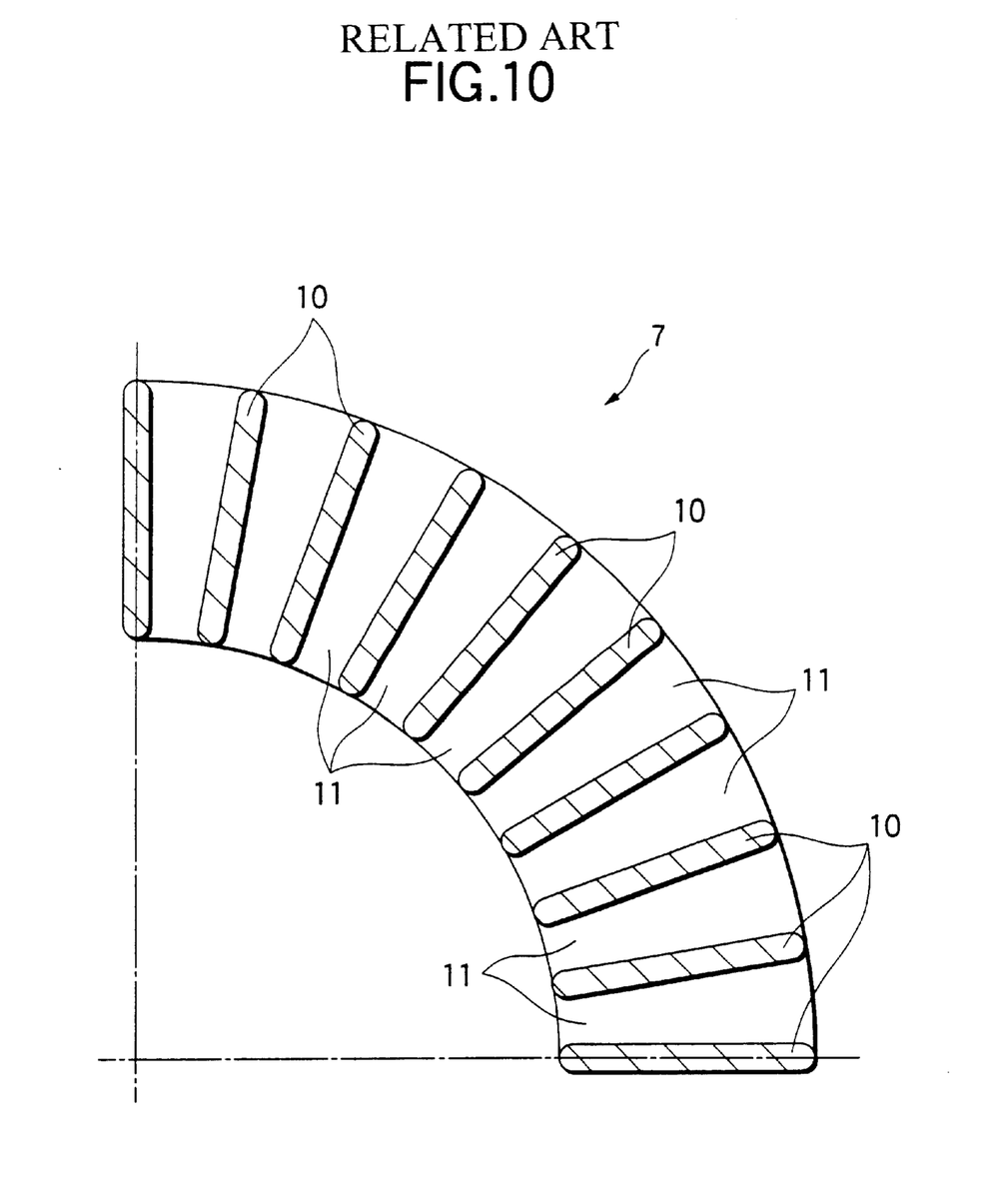
FIG. 10 is a schematic sectional view taken on line D—D in FIG. 9, showing a first example of the conventional structure.
Figure 11:
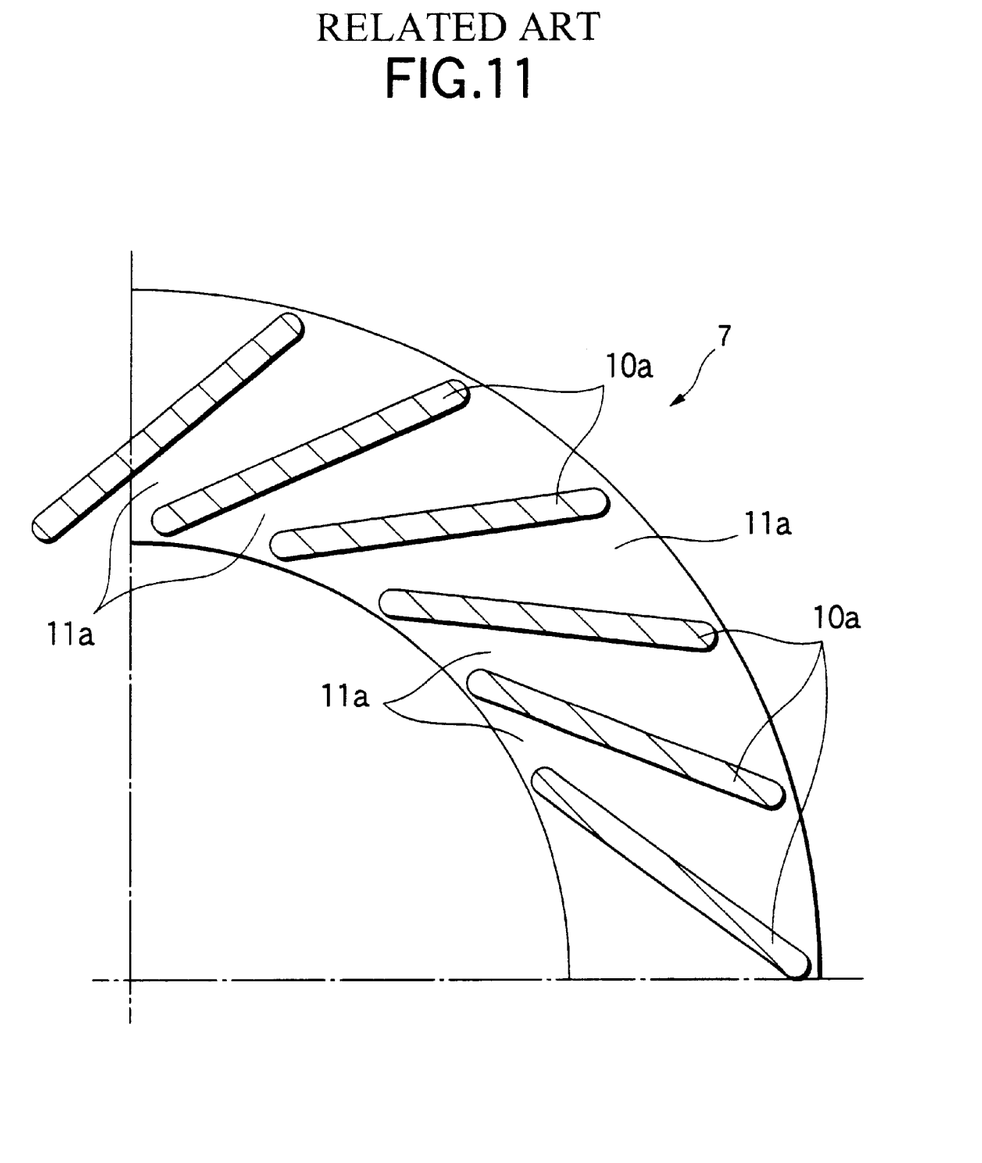
FIG. 11 is a schematic sectional view taken on line D—D in FIG. 9, showing a second example of the conventional structure.

Such a ventilated disc 7 is employed chiefly in a high-performance vehicle, or the like, which needs great braking ability. Generally, in the conventional ventilated disc 7, as shown in FIG. 10, a plurality of connecting ribs 10 are arranged radially. However, as shown in FIG. 11, a ventilated disc in which connecting ribs 10a are inclined in the direction of rotation of the ventilated disc is also known conventionally.

Figure 12:
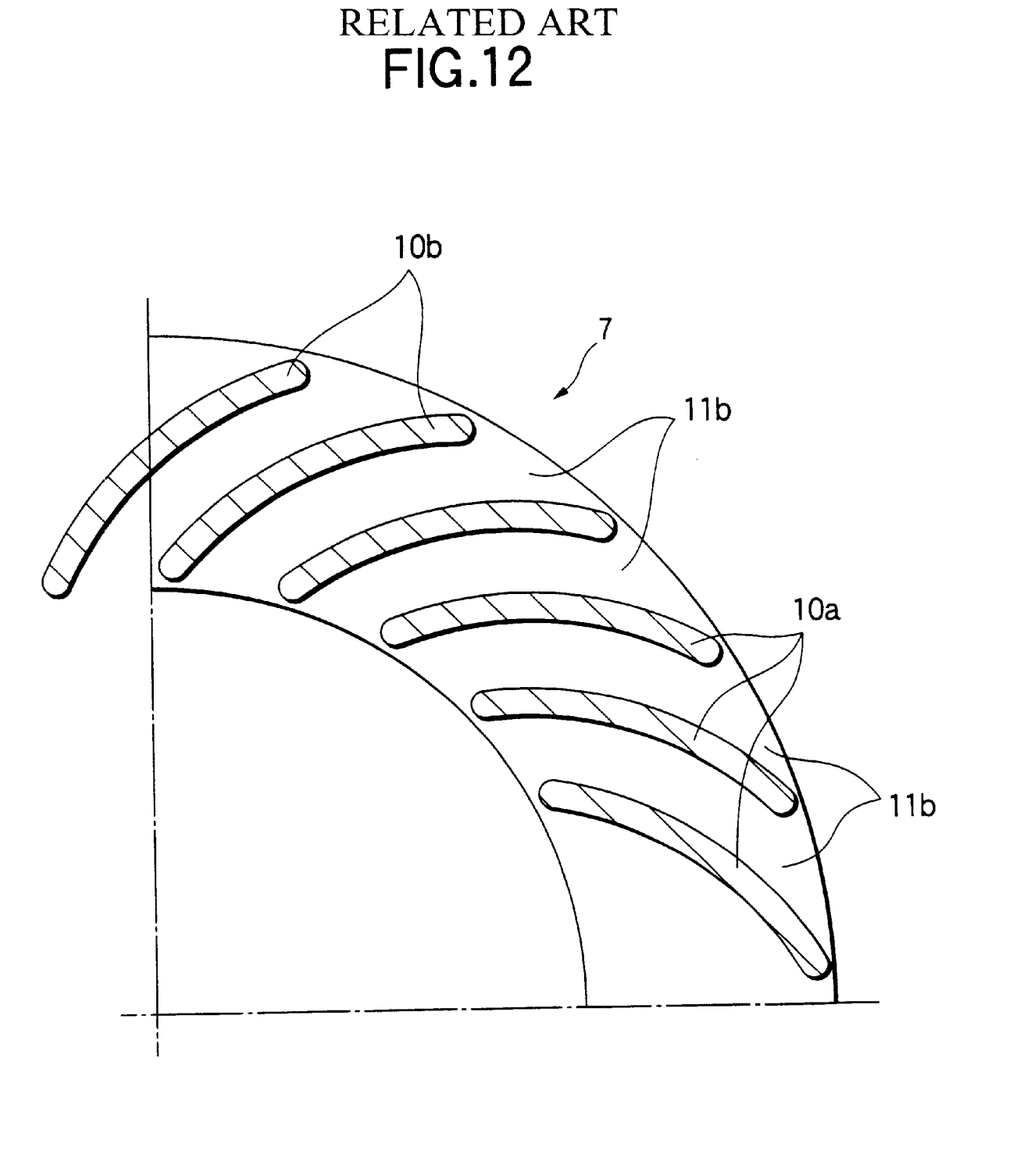
FIG. 12 is a schematic sectional view taken on line D—D in FIG. 9, showing a third example of the conventional structure.

Further, as shown in FIG. 12, a ventilated disc in which connecting ribs 10b each bent like an arc are inclined in the direction of rotation is also known conventionally, for example, as disclosed in JP-A-8-164828 and JP-B-54-14710. In the ventilated disc in which the connecting ribs 10a or 10b are inclined in the direction of rotation as described above, the pumping effect due to rotation becomes large. Accordingly, when a large amount of heat is generated in braking at the time of high-speed running, a large amount of air is made flow in the air channels 11a or 11b between circumferentially adjacent ones of the connecting ribs 10a or 10b. As a result, the effect of restraining the temperature rising of the ventilated disc is remarkable. In the case of using the ventilated disc shown in FIG. 11 or 12, however, it is necessary to regulate the direction of rotation of the ventilated disc (the counterclockwise direction in FIG. 11 or 12) in order to circulate a large amount of air into the air channels 11a or 11b. It is therefore impossible to standardize parts of the ventilated disc between right and left sides of the vehicle.

In the case of such a ventilated disc 7, as shown in FIGS. 9 to 12, which is generally conventionally used, vibration called judder is apt to be generated at the time of sudden braking or the like in the state of running at a high speed. That is, in each of the conventional structures shown in FIGS. 9 to 12, the distance between circumferentially adjacent ones of the connecting ribs 10, 10a or 10b is narrower on the inner diameter side of the ventilated disc 7 but wider on the outer diameter side thereof. On the other hand, the rigidity of the ventilated disc 7 in its axial direction is larger in portions corresponding to the connecting ribs 10, 10a or 10b, but smaller in portions corresponding to the air channels 11, 11a or 11b. Therefore, a difference between the rigidity in the portions corresponding to the connecting ribs 10, 10a or 10b and the rigidity in the portions corresponding to the air channels 11, 11a or 11b becomes more conspicuous on the outer diameter side than on the inner diameter side. As a result, slight circumferential irregularities are apt to be formed on the opposite surfaces of the ventilated disc 7 in finishing on the opposite surfaces for flattening.

In addition, such circumferential irregularities are also produced by the temperature rising of the ventilated disc 7 at the time of braking. That is, at the time of braking, the pair of pads 5 (FIG. 7) press the ventilated disc 7 from the axially opposite sides of the disc 7 strongly. Then, the temperature of the ventilated disc 7 rises due to the friction between the opposite surfaces of the ventilated disc 7 and the respective pads 5, so that the ventilated disc 7 expands thermally. Such thermal expansion due to the temperature rising becomes more conspicuous in the portions of the connecting ribs 10, 10a or 10b having large thermal capacity than in the portions of the air channels 11, 11a or 11b having small thermal capacity. Thus, the portions corresponding to the connecting ribs 10, 10a or 10b become recess portions, and the portions corresponding to the air channels 11, 11a or 11b become protrusion portions, so that slight irregularities are produced circumferentially. Particularly when the distance between circumferentially adjacent ones of the connecting ribs 10, 10a or 10b on the inner diameter side differs largely from that on the outer diameter side as in the conventional structures shown in FIGS. 10 to 12, the aforementioned irregularities produced by the difference in temperature rising are apt to be large and uneven between the inner diameter side and outer diameter side. Thus, vibration is apt to be produced as mentioned above.

In addition, in the case of the conventional structures shown in FIGS. 10 to 12, it is difficult to make the saving of weight compatible with the enhancement of heat radiation performance. That is, in order to enhance the heat radiation performance, it is considered that the number of the connecting ribs 10, 10a or 10b is increased so that the heat exchange area with the air flowing into the air channels 11, 11a or 11b is enlarged. If the number of the connecting ribs 10, 10a or 10b is increased, however, the weight of the ventilated disc 7 increases correspondingly. Undesirably, the ventilated disc 7 fixed to the wheel has a so-called unsprung load so that even a slight increase in weight results in deterioration in the performance of the vehicle mainly on comfortability. On the other hand, from the point of ensuring the strength of the ventilated disc 7, it is difficult to reduce the thickness of the connecting ribs 10, 10a or 10b so as to restrain the increase in weight.

Taking the foregoing circumstances into consideration, the present invention was developed to realize a ventilated disc which can prevent its axially opposite surfaces from being deformed to undulate circumferentially, and which is light in weight.

Like the aforementioned ventilated disc which has been conventionally known, a ventilated disc according to the present invention comprises a ring-like inner disc portion and a ring-like outer disc portion which are disposed parallelly and coaxially at a distance from each other; and a large number of connecting ribs for connecting opposite surfaces, of the disc portions, facing each other. The ventilated disc rotates together with a wheel while being fixed thereto. Then, the ventilated disc is rubbed by pads supported by the vehicle body at the time of braking.

Particularly, in the ventilated disc according to the present invention, the connecting ribs include a large number of first to fourth connecting ribs. Of those ribs, the first connecting ribs are provided in the inner-diameter-side portions on each of the opposite disc portions, and are long in the radial direction of the opposite disc portions respectively. The second and third connecting ribs are provided alternately circumferentially in the outer-diameter-side portions on each of the opposite disc portions, and are inclined reversely to each other with respect to the radial direction of the opposite disc portions, i.e. symmetric with respect to the radial direction. Each of the fourth connecting ribs is provided at a circumferential center of a portion where a distance between the second and third connecting ribs is largest.

Preferably, the second and third connecting ribs are provided so that a circumferential phase of inner-diameter-side end portions of the second and third connecting ribs coincides with that of the first connecting ribs, and a large number of fifth connecting ribs are provided between radially intermediate portions of the opposite disc portions so that a circumferential phase of the fifth connecting ribs is shifted by half a pitch from that of the first connecting ribs.

Further preferably, a distance between inner-diameter-side end portions of circumferentially adjacent ones of the first connecting ribs, a distance which is between outer-diameter end portions of circumferentially adjacent ones of the second and third connecting ribs and which is the narrowest one, a distance between outer-diameter-side end portions of circumferentially adjacent ones of the second and fourth connecting ribs, and a distance between outer-diameter-side end portions of circumferentially adjacent ones of the third and fourth connecting ribs are made substantially equal to one another.

In the case of such a ventilated disc according to the present invention as configured thus, a large difference in distance can be prevented from appearing between circumferentially adjacent ones of the connecting ribs. Accordingly, the opposite surfaces of the ventilated disc can be prevented from being deformed to undulate circumferentially with the finishing process applied to the opposite surfaces or the temperature rising at the time of braking. In addition, the first to fifth connecting ribs which are respectively shorter than connecting ribs constituting conventional structures are disposed radially and circumferentially. Accordingly, the total surface area of the connecting ribs can be enlarged without reducing the strength or without increasing the weight. It is therefore possible to realize a ventilated disc which is light in weight. Further, because the second and third connecting ribs are provided to be inclined reversely to each other, it is possible to realize a ventilated disc which can circulate a large amount of air inside the ventilated disc so as to exhibit an excellent cooling effect and in which the direction of attachment is not limited.

DETAILED DESCRIPTION OF THE PREFERRED EMBODIMENTS

FIGS. 1 to 6 show an embodiment of the present invention. In the same manner as the aforementioned conventional ventilated disc 7 shown in FIG. 9, a ventilated disc 7a according to the present invention is integrally made up from metal such as cast iron or the like. The ventilated disc 7a has a ring-like inner disc portion 8a and a ring-like outer disc portion 9a which are disposed parallelly and coaxially at a distance from each other. Then, respective surfaces of these disc portions 8a and 9a facing each other are connected to each other through numbers of first to fifth connecting ribs 13a, 13b and 14 to 17.

Figure 1:
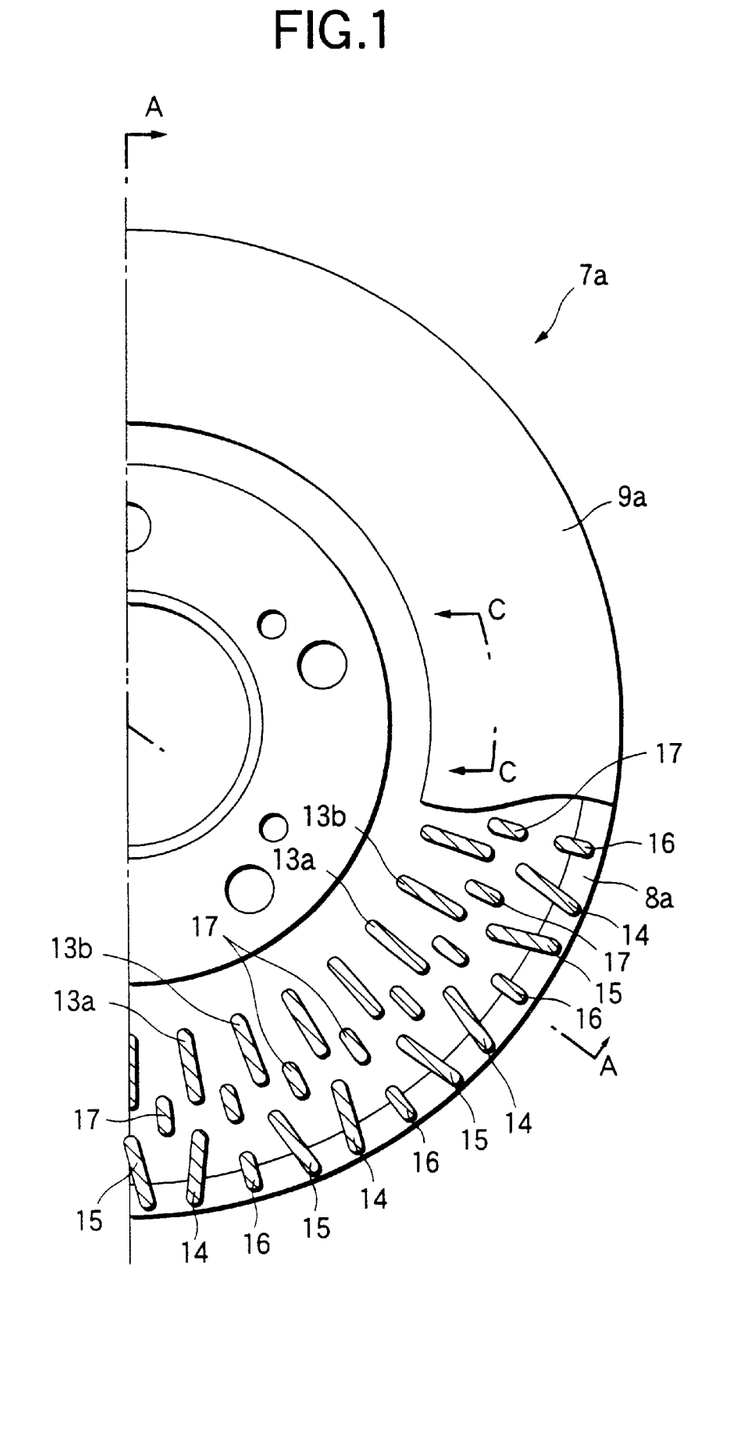
FIG. 1 is a partially cut-away front view showing an embodiment of the present invention.

Of those ribs, the first connecting ribs 13a and 13b are provided between inner-diameter-side portions of the above-mentioned disc portions 8a and 9a respectively. Each of the first connecting ribs 13a and 13b is formed linearly so as to long radially. On the other hand, the second and third connecting ribs 14 and 15 are provided alternately in the circumferential direction on outer-diameter-side portions between the disc portions 8a and 9a respectively. The second and third connecting ribs 14 and 15 are inclined at the same angle θ (for example, about 15 degrees) with respect to the direction of diameter of the disc portions 8a and 9a. Then, the second connecting ribs 14 are inclined reversely to the third connecting ribs 15. That is, the second connecting ribs 14 and the third connecting ribs 15 are symmetric with respect to the radial direction.

In addition, the second and third connecting ribs 14 and 15 are provided in portions where the circumferential phase of their inner-diameter-side end portions coincides with that of the first connecting ribs 13a and 13b. To say other words, the inner end portions of the second connecting ribs 14, 14 are located on the outer-diameter-side extension lines of a half of the first connecting ribs 13a disposed circumferentially alternately, respectively. On the other hand, the inner end portions of the third connecting ribs 15 are located on the outer-diameter-side extension lines of the first connecting ribs 13b. which are the other half of the first connecting ribs, respectively. Further, the second and third connecting ribs 14 and 15 are disposed so that circumferentially adjacent ones of them are paired to form a shape of "truncated-V".

Although the sectional shape of each of the second and third connecting ribs 14 and 15 is shown to be a straight line in the embodiment of FIG. 1, the sectional shape of each of the second and third connecting ribs 14 and 15 may be a curved line as shown in FIG. 12 which was described previously. Then, the second and third connecting ribs 14 and 15 are formed to be symmetric with each other with respect to the radial direction. This is because the ventilated discs 7a having the same shape can be used in the left and right sides of a vehicle by eliminating limit on the direction of rotation of the disc 7a.

On the other hand, the respective fourth connecting ribs 16 are provided radially between outer-diameter-side portions of the opposite disc portions 8a and 9a. Each of the fourth connecting ribs 16 is formed to have a sectional shape like a straight line which is shorter than any of the first to third connecting ribs 13a, 13b, 14 and 15. In addition, each of the fourth connecting ribs 16 is provided on the outer-diameter-side end portions on a circumferentially central portion where the distance between circumferentially adjacent ones of the second connecting ribs 14 and the third connecting ribs 15 is largest.

Further, the fifth connecting ribs 17 are provided radially between diameter-direction intermediate portions of the opposite disc portions 8a and 9a. Each of the fifth connecting ribs 17 is formed to have a sectional shape like a straight line which is shorter than any of the first to third connecting ribs 13a, 13b, 14 and 15, in the same manner as the fourth connecting ribs 16 described above. In addition, the respective fifth connecting ribs 17 are provided in portions where the circumferential phase of the fifth connecting ribs 17 is shifted by half a pitch from that of the first connecting ribs 13a and 13b. Therefore, the respective fifth connecting ribs 17 are located in the central portions of the outer-diameter-side opening portions of the air channels 11c each of which is located between circumferentially adjacent ones of the first connecting ribs 13a and 13b. In addition, the circumferential phase of the fourth connecting ribs 16 coincides with that of the fifth connecting ribs 17. To say other words, the fifth connecting ribs 17 are located on the inner-diameter-side extension lines of the fourth connecting ribs 16 respectively. Incidentally, each of the lengthwise opposite edge portions of the connecting ribs 13a, 13b and 14 to 17 described above is formed to be a convex curved surface like a semi-cylindrical surface.

In addition, length $L_{17}$ of each of the fifth connecting ribs 17 is made larger than length $L_{18}$ of each of radial gaps 18 which are located between the first connecting ribs 13a and 13b and the second and third connecting ribs 14 and 15 radially adjacent to each other ($L_{17} > L_{18}$). Further, the radially central positions of the respective fifth connecting ribs 17 are made to coincide with the radially central positions of the respective radial gaps 18. Therefore, the air passing through the radial gaps 18 in the circumferential direction collides with the fifth connecting ribs 17. Thus, there is no fear that the air passing through the radial gaps 18 reaches adjacent ones of the radial gaps 18 directly (without flowing radially outward).

Figure 2:
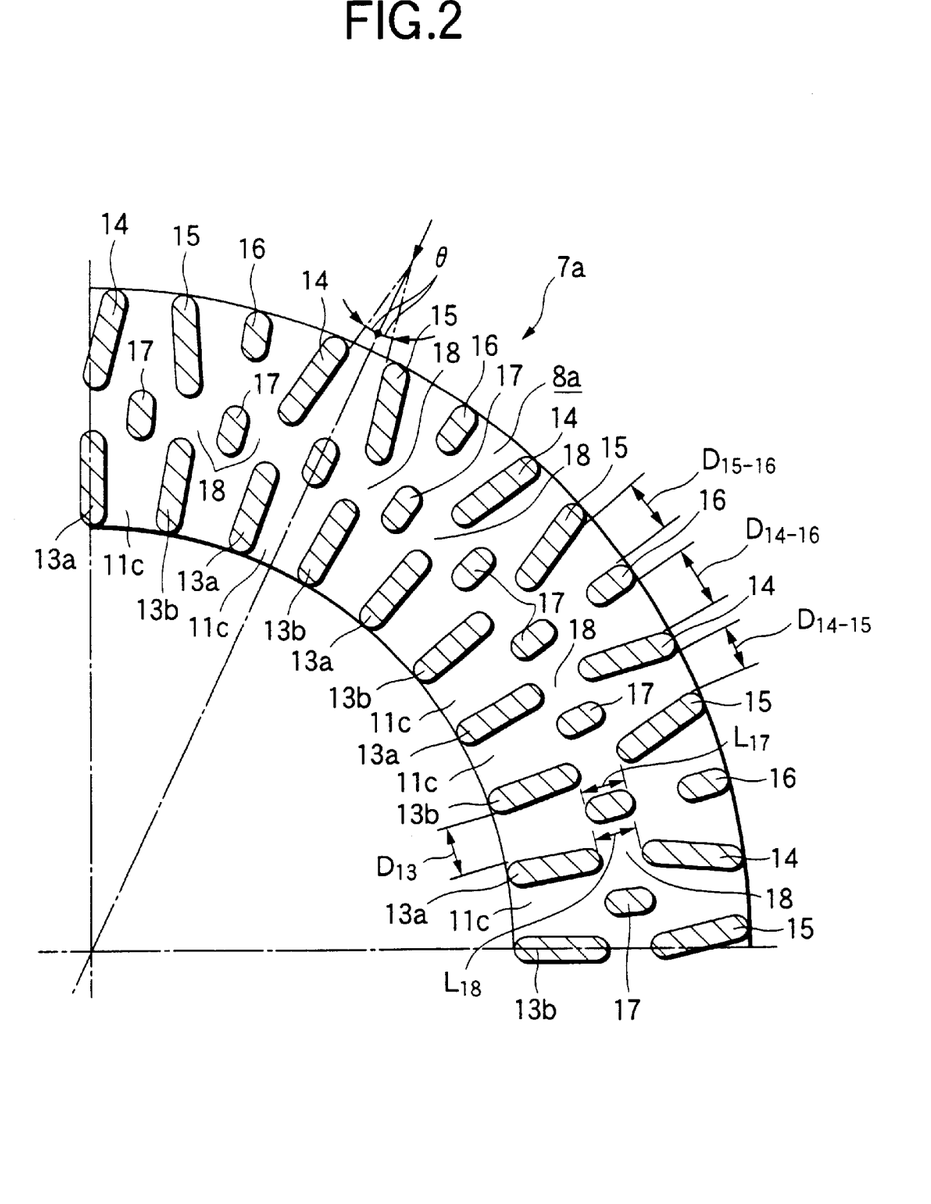
FIG. 2 is a cut-away front view of a main portion of the same embodiment.
Figure 3:
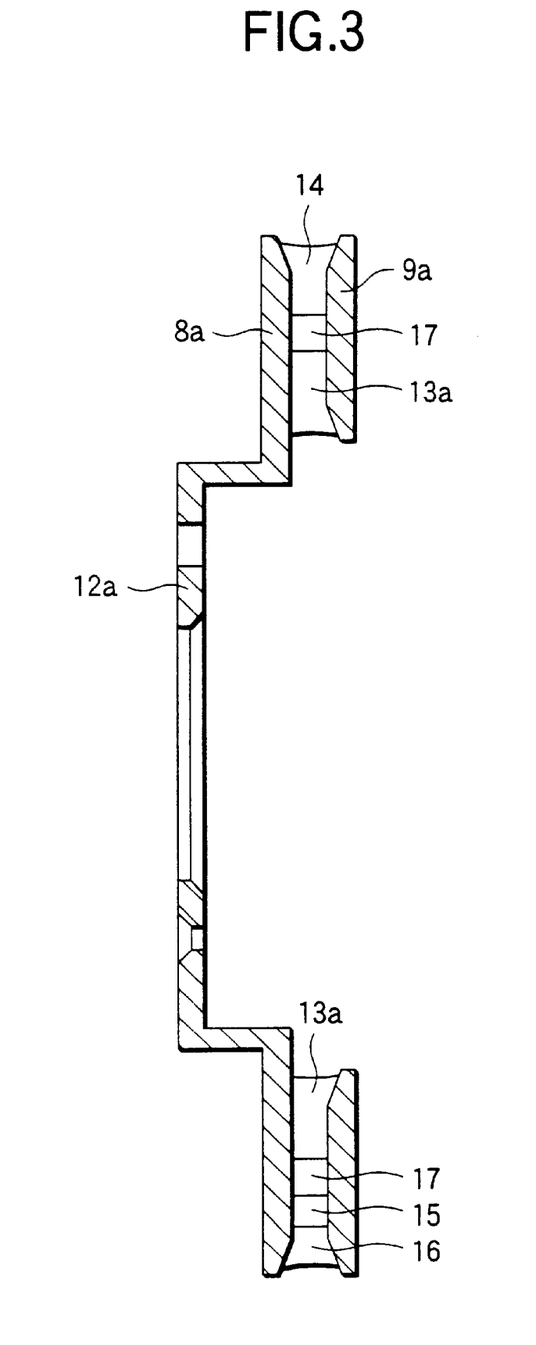
FIG. 3 is a sectional view taken on line A—A in FIG. 1.
Figure 4:
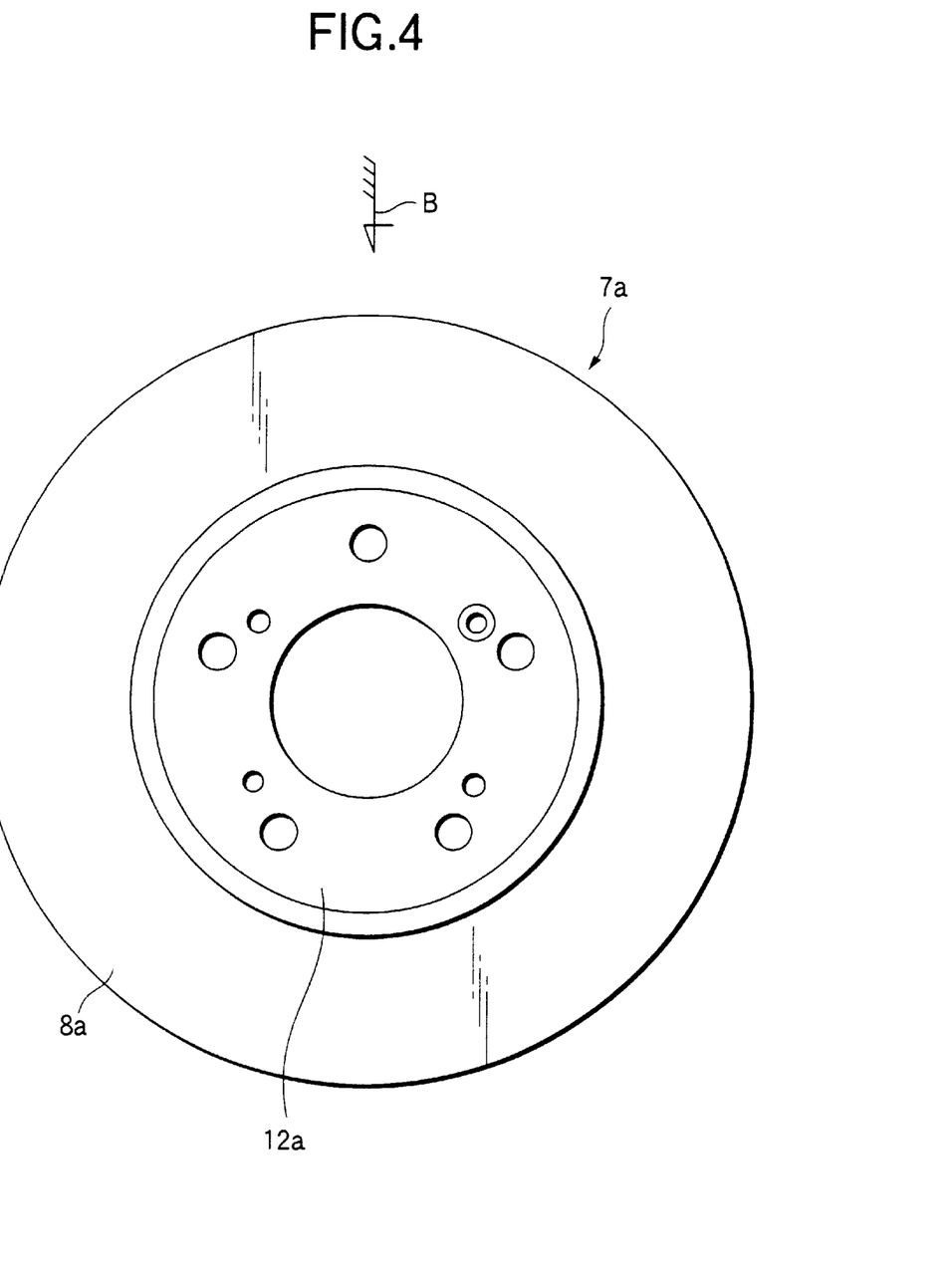
FIG. 4 is a back view from the left of FIG. 3.
Figure 5:
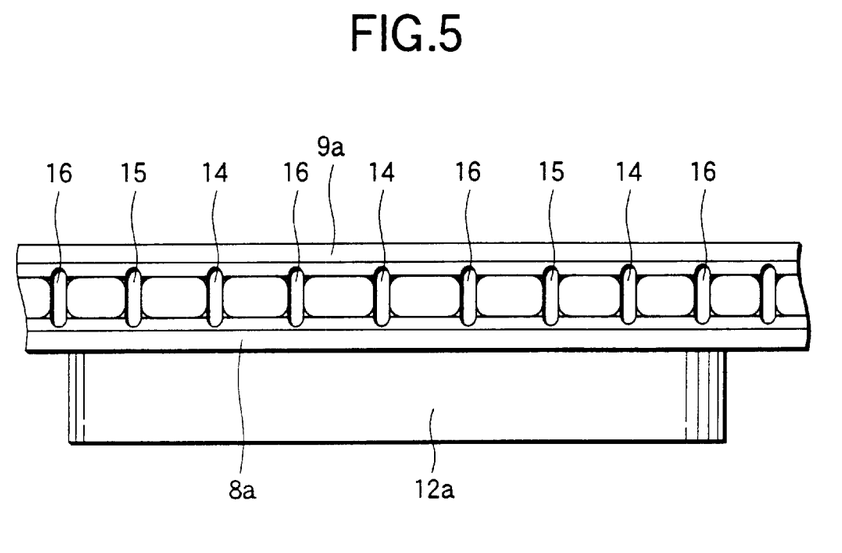
FIG. 5 is a view from an arrow B in FIG. 4.
Figure 6:
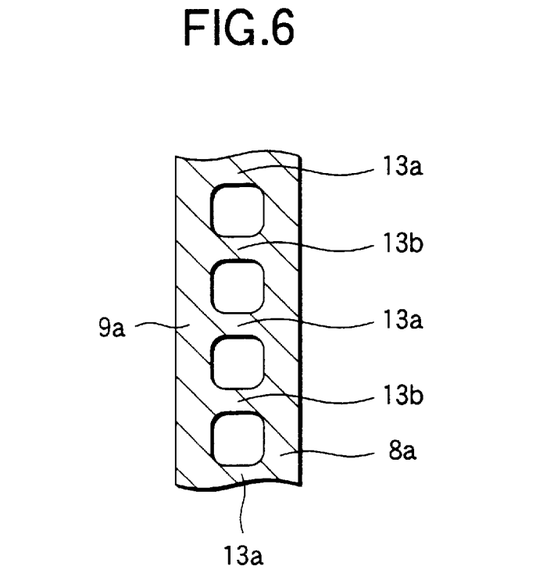
FIG. 6 is a sectional view taken on line C—C in FIG. 1.

Further, the inclination angle θ of each of the second and third connecting ribs 14 and 15 with respect to the radial direction of the opposite disc portions 8a and 9a (and further the width of each rib) is regulated. As a result, a distance $D_{13}$ between inner-diameter-side end portions of circumferentially adjacent ones of the first connecting ribs 13a and 13b, a distance $D_{14-15}$ between circumferentially adjacent ones of the second connecting ribs 14 and the third connecting ribs 15 which is the narrowest in the outer-diameter end portions, a distance $D_{14-16}$ between outer-diameter-side end portions of circumferentially adjacent ones of the second connecting ribs 14 and the fourth connecting ribs 16, and a distance $D_{15-16}$ between outer-diameter-side end portions of circumferentially adjacent ones of the third connecting ribs 15 and the fourth connecting ribs 16, 16. are made substantially equal to one another ($D_{13} \approx D_{14-15} \approx D_{14-16} \approx D_{15-16}$). The statement that the distances $D_{13}$, $D_{14-15}$, $D_{14-16}$ and $D_{15-16}$ are substantially equal to one another means that a difference between the largest one of the distances and the smallest one thereof is within 20%, preferably within 10%, in view of the largest one.

In the case of the ventilated disc 7a according to the present invention configured thus, it is possible to prevent a large difference from appearing in distance between circumferentially adjacent ones of the connecting ribs. That is, the second and third connecting ribs 14 and 15 provided on the outer-diameter side, where the distance between circumferentially adjacent ones of the connecting ribs is apt to be large, are inclined with respect to the radial direction. Thus, the distance between circumferentially adjacent ones of the second and third connecting ribs 14 and 15 at the outer-diameter-side end portions can be made narrow alternately so as to be equal to the distance $D_{13}$ between circumferentially adjacent ones of the first connecting ribs 13a and 13b on the inner-diameter-side end portions. In addition, the respective fourth connecting ribs 16 are provided in portions where the distance between circumferentially adjacent ones of the second and third connecting ribs 14 and 15 on the outer-diameter-side end portions is set to be large alternately. The fourth ribs 16 are provided in those enlarged distances between the ribs 14 and 15. Thus, each distance of this portion can be made substantially equal to the distance $D_{13}$ between the inner-diameter-side end portions of the first connecting ribs 13a and 13b.

Thus, according to the present invention, the respective distances $D_{13}$, $D_{14-15}$, $D_{14-16}$ and $D_{15-16}$ between circumferentially adjacent ones of the connecting ribs 13a, 13b and 14 to 16 can be made substantially equal to one another all over the ventilated disc 7a. As a result, the opposite surfaces of the ventilated disc 7a can be prevented from being deformed to undulate circumferentially with the process of finishing the opposite surfaces or the temperature rising at the time of braking. That is, the distances $D_{13}$, $D_{14-15}$, $D_{14-16}$ and $D_{15-16}$ are made to equal to one another so that the axial rigidity of the ventilated disc 7a is made substantially even all over the ventilated disc 7a. Therefore, irregularities which may cause vibration called judder described above are difficult to be formed with the above-mentioned finishing process (the finishing accuracy is enhanced).

In addition, as the distances $D_{13}$, $D_{14-15}$, $D_{14-16}$ and $D_{15-16}$ are equal to one another, there is no fear that a difference in thermal expansion quantity between the portion corresponding to each of the connecting ribs 13a, 13b and 14 to 17 and the portion corresponding to each of the air channels which are provided in the portions away from the connecting ribs 13a, 13b and 14 to 17 becomes uneven over the ventilated disc 7a due to temperature rising at the time of braking even if such a difference appears. That is, also in the case of the present invention, it is inevitable that there appears a difference in thermal expansion quantity between the portion corresponding to each of the connecting ribs 13a, 13b and 14 to 17 and the portion corresponding to each of the air channels which are provided in the portions away from the connecting ribs 13a, 13b and 14 to 17, so that fine irregularities are produced on the opposite surfaces of the ventilated disc 7a. However, there is no fear that the distribution and height of the irregularities on the inner diameter side differ from those on the outer diameter side. To say other words, fine irregularities due to the temperature rising become substantially uniform all over the opposite surfaces of the ventilated disc 7a. Such uniform irregularities do not make the contact surface pressure uneven between each of the opposite surfaces of the ventilated disc 7a and each of the pads 5 (see FIG. 7) in view of the whole friction surfaces of the ventilated disc 7a at the time of braking. Thus, such uniform irregularities hardly cause vibration called judder described above.

Further, the connecting ribs 13a, 13b and 14 to 17, which are shorter than the connecting ribs 10, 10a and 10b (see FIGS. 10 to 12) constituting the conventional structures, are disposed radially and circumferentially. Accordingly, the total surface area of the connecting ribs 13a, 13b and 14 to 17 can be enlarged without reducing the strength or without increasing the weight. Thus, the ventilated disc 7a can be made light in weight. Further, because the second and third connecting ribs 14 and 15 are provided to be inclined at the same angle θ reversely to each other, it is possible to realize a ventilated disc which can circulate a large amount of air inside the ventilated disc so as to exhibit an excellent cooling effect, and in which the direction of attachment is not limited.

Since a ventilated disc according to the present invention is configured to operate thus, the ventilated disc can contribute to realizing a disc brake which prevents vibration from being generated at the time of braking so as not to give an unpleasant feeling to crew members and so on. In addition, though the ventilated disc has a structure with an excellent cooling efficiency, the direction of rotation of the ventilated disc is not limited. Accordingly, ventilated discs having the same shape can be used in the left and right sides of a vehicle, so that the cost can be reduced by the standardization of parts.

What is claimed is:
1. A ventilated disc comprising:
  a ring-like inner disc portion;
  a ring-like outer disc portion; and
  connecting ribs for connecting surfaces of said inner and outer disc portions, said connecting ribs including:
    first connecting ribs provided between inner-diameter-side portions of said inner and outer disc portions and long in radial directions of said inner and outer disc portions;
    second and third connecting ribs provided alternately circumferentially between outer-diameter-side portions of said inner and outer disc portions and inclined reversely to each other with respect to radial directions of said inner and outer disc portions,
    fourth connecting ribs provided at a circumferentially central portion of a largest distance between adjacent ones of said second and third connecting ribs and between said outer-diameter-side portions of said inner and outer disc portions,
  wherein said inner and outer disc portions are opposed to each other and are parallel, and coaxial, and are at a predetermined distance therebetween.

2. The ventilated disc according to claim 1, wherein the second and third connecting ribs are provided so that a circumferential phase of inner-diameter-side end portions of said second and third connecting ribs coincides with that of the first connecting ribs.

3. The ventilated disc according to claim 1, wherein said connecting ribs further include fifth connecting ribs provided between radially intermediate portions of said inner and outer disc portions, and a circumferential phase of the fifth connecting ribs is shifted by half a pitch from that of said first connecting ribs.

4. The ventilated disc according to claim 2, wherein said connecting ribs further include fifth connecting ribs provided between radially intermediate portions of said inner and outer disc portions, and a circumferential phase of the fifth connecting ribs is shifted by half a pitch from that of said first connecting ribs.

5. The ventilated disc according to claim 3, wherein a length of the fifth connecting ribs is made larger than a length of each of a radial gap located between the first connecting rib and one of the second and third connecting ribs.

6. The ventilated disc according to claim 1, wherein the first to fourth connecting ribs define:
  a first distance between inner-diameter-side end portions of circumferentially adjacent ones of the first connecting ribs;
  a second distance between outer-diameter-side end portions of circumferentially adjacent ones of the second and third connecting ribs and being the narrowest one;
  a third distance between outer-diameter-side end portions of circumferentially adjacent ones of the second and fourth connecting ribs; and
  a fourth distance between outer-diameter-side end portions of circumferentially adjacent ones of the third and fourth connecting ribs,
  wherein the first to fourth distances are substantially equal to one another.

7. The ventilated disc according to claim 2, wherein the first to fourth connecting ribs define:
  a first distance between inner-diameter-side end portions of circumferentially adjacent ones of the first connecting ribs;
  a second distance between outer-diameter-side end portions of circumferentially adjacent ones of the second and third connecting ribs and being the narrowest one;
  a third distance between outer-diameter-side end portions of circumferentially adjacent ones of the second and fourth connecting ribs; and
  a fourth distance between outer-diameter-side end portions of circumferentially adjacent ones of the third and fourth connecting ribs,
  wherein the first to fourth distances are substantially equal to one another.

8. The ventilated disc according to claim 3, wherein the first to fourth connecting ribs define:
  a first distance between inner-diameter-side end portions of circumferentially adjacent ones of the first connecting ribs;

a second distance between outer-diameter-side end portions of circumferentially adjacent ones of the second and third connecting ribs and being the narrowest one;

a third distance between outer-diameter-side end portions of circumferentially adjacent ones of the second and fourth connecting ribs; and a fourth distance between outer-diameter-side end portions of circumferentially adjacent ones of the third and fourth connecting ribs, wherein the first to fourth distances are substantially equal to one another.

9. The ventilated disc according to claim 6, wherein a difference between the largest one and the smallest one among the first to fourth distances is within 20% in view of the largest one.

10. The ventilated disc according to claim 6, wherein a difference between the largest one and the smallest one among the first to fourth distances is within 10% in view of the largest one.

11. The ventilated disc according to claim 1, wherein the sectional shape of each of the second and third connecting ribs is formed as curved line and to be symmetric with each other with respect to the radial direction.

12. The ventilated disc of claim 1, wherein the second rib has a longitudinal axis and the third rib has a longitudinal axis, and the second rib longitudinal axis is inclined with respect to the radial direction of said inner and outer disc portions and with respect to the third rib longitudinal axis.

* * * * *